(12) United States Patent
Dalberg et al.

(10) Patent No.: US 11,644,353 B2
(45) Date of Patent: May 9, 2023

(54) FLOW CONTROL MODULE WITH A THERMAL MASS FLOW METER

(71) Applicant: THE COCA-COLA COMPANY, Atlanta, GA (US)

(72) Inventors: James Dalberg, Atlanta, GA (US); Jevawn Sebastian Roberts, Tucker, GA (US); Brian B. Johnson, Roswell, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 154 days.

(21) Appl. No.: 17/273,982

(22) PCT Filed: Sep. 6, 2019

(86) PCT No.: PCT/US2019/049870
§ 371 (c)(1),
(2) Date: Mar. 5, 2021

(87) PCT Pub. No.: WO2020/051409
PCT Pub. Date: Mar. 12, 2020

(65) Prior Publication Data
US 2021/0356305 A1    Nov. 18, 2021

Related U.S. Application Data

(60) Provisional application No. 62/727,702, filed on Sep. 6, 2018.

(51) Int. Cl.
*G01F 1/688* (2006.01)
*G01F 1/684* (2006.01)
(Continued)

(52) U.S. Cl.
CPC .............. *G01F 1/684* (2013.01); *G01F 1/688* (2013.01); *G01F 1/696* (2013.01); *G05D 7/0623* (2013.01); *G05D 7/0635* (2013.01)

(58) Field of Classification Search
CPC .......... G01F 1/684; G01F 1/688; G01F 1/696; G05D 7/0623; G05D 7/0635
(Continued)

(56) References Cited

U.S. PATENT DOCUMENTS 4,886,190 A * 12/1989 Kirschner ............ B67D 1/1256
222/145.6
4,955,507 A * 9/1990 Kirschner ............ B67D 1/0078
137/100
(Continued)

FOREIGN PATENT DOCUMENTS

JP         07-190237 A      7/1995
KR   10-2015-0140306 A    12/2015
(Continued)

OTHER PUBLICATIONS

Extended European Search Report issued in EP 19857906.2, dated May 3, 2022.
(Continued)

*Primary Examiner* — Minh Q Le
(74) *Attorney, Agent, or Firm* — Meunier Carlin & Curfman LLC

(57) ABSTRACT

A flow control module with a thermal mass flow meter is provided. The thermal mass flow meter facilitates measuring both a flow rate and a temperature of a fluid passing through the flow control module. Fluids may experience different flow characteristics at different temperature ranges. The flow control module includes a proportional control valve for selectively adjusting the flow rate of the fluid passing through the flow control module. Upon detecting that the temperature of the fluid is outside of a temperature range for the fluid, a controller is configured to load a different set of calibration parameters for controlling the operation of the proportional control valve to accommodate the different flow characteristics of the fluid at that temperature. Addi- (Continued)

tionally, the controller is configured to detect bubbles using the thermal mass flow meter based upon the difference in thermal conductivity of gasses and liquids.

16 Claims, 10 Drawing Sheets

(51) Int. Cl.
*G01F 1/696* (2006.01)
*G05D 7/06* (2006.01)

(58) Field of Classification Search
USPC ....... 137/468, 487.5, 12.5, 9, 101.21, 87.03, 137/613, 101.19, 115.03, 315.03, 486, 137/260; 222/129.4, 145.7
See application file for complete search history.

(56) References Cited

U.S. PATENT DOCUMENTS

| | | | |
|---|---|---|---|
| 5,381,926 A * | 1/1995 | Credle, Jr. | B67D 1/0032 222/1 |
| 5,464,038 A * | 11/1995 | Kruto | G05D 7/0635 431/86 |
| 7,077,290 B2 | 7/2006 | Bethuy et al. | |
| 7,216,019 B2 | 5/2007 | Tinsley et al. | |
| 7,578,415 B2 | 8/2009 | Ziesel et al. | |
| 7,866,509 B2 | 1/2011 | Ziesel et al. | |
| 8,333,224 B2 | 12/2012 | Sheehy et al. | |
| 9,394,154 B2 | 7/2016 | Connerat et al. | |
| 10,472,220 B2 | 11/2019 | Moore et al. | |
| 10,631,558 B2 | 4/2020 | White et al. | |
| 2007/0018778 A1* | 1/2007 | Abe | G01K 1/10 374/E1.014 |
| 2011/0308328 A1 | 12/2011 | Haartsen et al. | |
| 2012/0228328 A1 | 9/2012 | Thomas et al. | |
| 2014/0299204 A1* | 10/2014 | Somani | G05D 7/0635 137/486 |
| 2015/0082243 A1 | 3/2015 | Taylor et al. | |
| 2015/0144543 A1* | 5/2015 | Kondo | G01F 1/696 73/204.27 |
| 2017/0088410 A1 | 3/2017 | Wing et al. | |
| 2017/0184432 A1* | 6/2017 | Umezawa | G01F 1/688 |
| 2018/0023995 A1* | 1/2018 | Govyadinov | B41J 2/14201 73/1.16 |
| 2019/0049278 A1* | 2/2019 | Yamazaki | G01F 1/696 |
| 2019/0086248 A1* | 3/2019 | Yamazaki | G01F 1/6965 |
| 2019/0308866 A1 | 10/2019 | Sawhney et al. | |
| 2019/0339298 A1* | 11/2019 | Bonanomi | G01F 1/688 |

FOREIGN PATENT DOCUMENTS

| | | |
|---|---|---|
| WO | 2011085012 A2 | 7/2011 |
| WO | 2015167846 A1 | 11/2015 |
| WO | 2018160972 A1 | 9/2018 |

OTHER PUBLICATIONS

International Search Report and Written Opinion for International Application No. PCT/US2019/049870 dated Dec. 24, 2019.
International Preliminary Report on Patentability issued for Application No. PCT/US2019/049870, dated Mar. 18, 2021. 9 pages.
Maarten Vraanes, "Thermal Mass Flow Sensors for Gas and Liquid Applications", Nov. 15, 2017, 5 pages.
Digmesa FHKU—The All-Rounder Liquid Flow Sensing Solution. Flow Sensor FHKU Technical Information. Nov. 2015. 6 pages.
GEMSSensor—Turbine Flow Rate Sensor FT-100 Series NSF Approved Instruction Bulletin No. 208694 (Rev. C). Operating and Installation Instructions. Dec. 26, 2016. 2 pages.
Memsic—Ultra High Performance ±1g Dual Axis Accelerometer with Digital Outputs. MXD6235Q. Apr. 2010. 6 pages.
Renesas—Gas and Liquid Flow Sensor Module. FS1012 Datasheet, Nov. 2018. 9 pages.
SwissFlow—Infrared Flow Meters. Mar. 1, 2012. 3 pages.

* cited by examiner

FLOW CONTROL MODULE WITH A THERMAL MASS FLOW METER

CROSS-REFERENCE TO RELATED APPLICATIONS

This application is a national stage application filed under 35 U.S.C. § 371 of PCT/US2019/049870 on Sep. 6, 2019, which claims the benefit of U.S. Provisional Patent Application Ser. No. 62/727,702 filed Sep. 6, 2018, the disclosures of which are expressly incorporated herein by reference.

FIELD OF THE INVENTION

This invention generally relates to flow control valves, and more particularly to a flow control valves with a thermal mass flow meter, shut-off valve, and a proportional flow control valve.

BACKGROUND OF THE INVENTION

Solenoid actuated flow control valves are readily recognized as providing accurate flow control. In their most basic form, a solenoid having movable armature is attached to a housing of the valve. The armature moves linearly to open and close a flow path through the valve and/or control the flow characteristics of the flow through the valve. This armature may act directly on a port along the flow path to open and close the port or control flow through the port. Alternatively, the armature may act on another member such as valve member, e.g. a diaphragm, to effectuate flow control.

BRIEF SUMMARY OF THE INVENTION

In a first aspect of the disclosure, a flow control module comprises a housing having an inlet and an outlet and a passageway extending between the inlet and the outlet. The passageway defining a flow path through the flow control module. The flow control module also comprises a thermal mass flow meter. The thermal mass flow meter is located between the inlet and the outlet along the flow path. The thermal mass flow meter is configured to communicate a first signal based on a flow rate of a fluid along the flow path. The flow control module also comprises a first solenoid assembly mounted to the housing. The first solenoid assembly configured as an on/off solenoid assembly such that the first solenoid assembly is operable to allow the fluid to flow along the flow path in an on position and prevent the fluid from flowing along the flow path in an off position. The flow control module also comprises a second solenoid assembly mounted to the housing, the second solenoid assembly configured as a proportional solenoid assembly such that the second solenoid assembly is operable to receive a second signal in response to communication of the first signal and to proportionally control a flow rate of the fluid along the flow path through the flow control module based on the second signal.

In certain implementations according to the first aspect, the thermal mass flow meter is further configured to communicate a third signal based on a measured temperature of the fluid.

In certain implementations according to the first aspect, the second solenoid assembly is further configured to proportionally control the flow rate of the fluid based on a new set of calibration parameters upon a determination that the measured temperature of the fluid is outside a temperature range for the fluid.

In certain implementations according to the first aspect, the new set of calibration parameters change one or more of a location of an armature of the second solenoid assembly for a given flow rate, how often the second solenoid assembly makes adjustments made to proportionally control the flow rate, or how fast the armature of the second solenoid assembly moves to proportionally control the flow rate.

In certain implementations according to the first aspect, the thermal mass flow meter comprises a heater and a temperature sensor located at a distance toward the outlet relative to the heater.

In certain implementations according to the first aspect, the thermal mass flow meter is configured to generate the first signal based on a measured amount of heat transferred from the heater to the temperature sensor.

In certain implementations according to the first aspect, the first signal is a voltage or current value of the measured amount of heat transferred or a flow rate value determined by the thermal mass flow meter based on the measured amount of heat transferred.

In certain implementations according to the first aspect, the temperature sensor comprises a thermocouple, a thermopile, or thermistor.

In a second aspect of the disclosure, a fluid dispenser comprises a controller and a flow control module. The flow control module comprises a housing having an inlet and an outlet and a passageway extending between the inlet and the outlet. The passageway defining a flow path through the flow control module. The flow control module also comprises a thermal mass flow meter. The thermal mass flow meter is located between the inlet and the outlet along the flow path. The thermal mass flow meter is configured to communicate a first signal to the controller based on a flow rate of a fluid along the flow path. The flow control module also comprises a shut-off valve configured to allow the fluid to flow along the flow path in an open position and prevent the fluid from flowing along the flow path in a closed position. The flow control module also comprises a proportional control valve configured to receive a second signal from the controller in response to communication of the first signal and to proportionally control a flow rate of the fluid along the flow path through the flow control module based on the second signal.

In certain implementations according to the second aspect, the controller is configured to determine the flow rate of the fluid based on the first signal.

In certain implementations according to the second aspect, the first signal is a voltage or current value produced by the thermal mass flow meter or a flow rate value determined by the thermal mass flow meter.

In certain implementations according to the second aspect, the controller is further configured to compare the determined flow rate of the fluid to a predetermined flow rate and to generate the second signal based on the comparison.

In certain implementations according to the second aspect, the controller is further configured to receive the predetermined flow rate from a database.

In certain implementations according to the second aspect, the controller is further configured to detect a change in phase of the fluid based on a comparison of the first signal to a threshold value indicative of the change in phase of the fluid.

In certain implementations according to the second aspect, the controller is further configured to detect a bubble based on the change in phase of the fluid.

In certain implementations according to the second aspect, the controller is configured to detect the bubble based upon detection of the change in phase for more than a predetermined threshold amount of time.

In certain implementations according to the second aspect, the controller is further configured to generate a maintenance alert or a sold-out alert upon detection of a threshold number of bubbles or a threshold number of bubbles within a predetermined time period.

In a third aspect of the disclosure, a sold-out detection system comprises a sold-out sensor. The sold-out sensor comprises a housing comprising an inlet and an outlet and a passageway extending between the inlet and the outlet. The passageway defining a flow path through the sold-out. The sold-out sensor also comprises a thermal mass flow meter comprising a heater and a temperature sensor located at a distance toward the outlet relative to the heater. The thermal mass flow meter is configured to generate a first signal based on a measured amount of heat transferred from the heater to the temperature sensor by a flow of a fluid along the flow path. The sold-out detection system also comprises a controller configured to receive the first signal and detect a change in phase of the fluid based on a comparison of the first signal to a threshold value indicative of the change in phase of the fluid.

In certain implementations according to the third aspect, the controller is further configured to detect a bubble based on the detected change in phase of the fluid, and wherein the controller is further configured to detect a sold-out condition upon detection of a threshold number of bubbles or a threshold number of bubbles within a predetermined time period.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
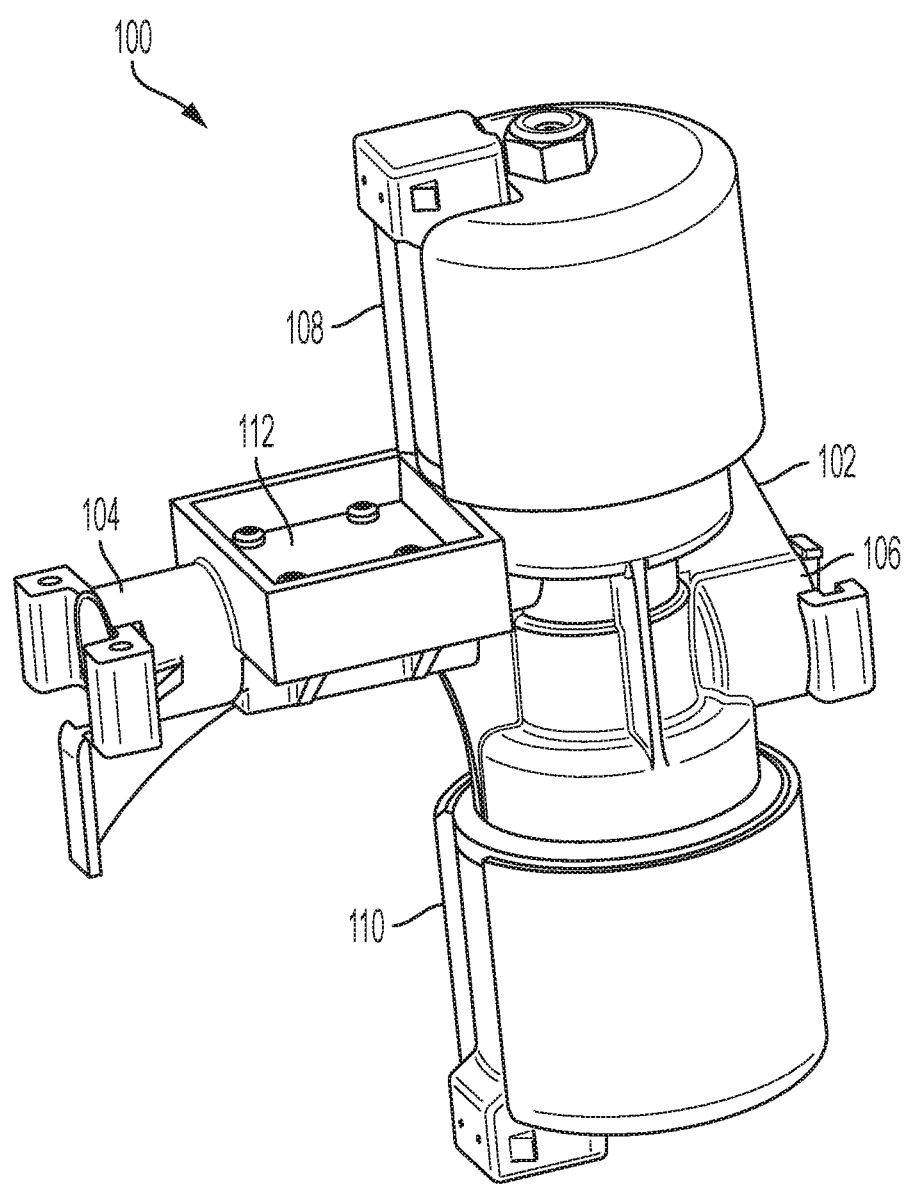
FIG. 1 is a perspective view of an exemplary embodiment of a flow control module according to the teachings herein.

Turning now to the illustrations, FIG. 1 illustrate an embodiment of a flow control valve (referred to herein as a flow control module) according to the teachings herein. The flow control module is a dual-solenoid assembly arrangement, with each solenoid assembly functionally acting on a flow through the flow control module. One solenoid assembly is configured as an on/off solenoid assembly or shut-off solenoid assembly, which is defined herein as a solenoid assembly which acts to fully open or fully close a flow path through the flow control module by having two discrete positions, one in which flow is permitted along the flow path and one in which flow is not permitted.

The other solenoid assembly is configured as a proportional solenoid assembly, which is defined herein as a solenoid assembly which acts to proportionally control a flow of fluid along the flow path through the flow control module, where there exists a proportional relationship between flow rate and a position of an armature of the proportional solenoid assembly.

A flow body is positioned along the flow path between the first and second solenoid assemblies. The flow body advantageously allows for a smooth transition for the flow through the flow control module between the inlet and outlet side thereof. As used herein, the inlet side of the flow control module is the region of the flow path upstream from the flow body relative to a flow direction (i.e. the direction moving from the inlet to the outlet along the flow path), and the outlet side of the flow control module is the region of the flow path downstream from the flow body relative to the flow direction. The flow body achieves this smooth transitioning by employing a passageway having a transition region with a variable cross section.

The second solenoid assembly is configured to maintain the laminar characteristics of the flow through the flow control module. In particular, the second solenoid assembly includes an armature having an annular flow channel which is selectively alignable with a plurality of ports formed through an outer sleeve surrounding the armature. These ports open to an annular flow region surrounding the exterior of the outer sleeve and bounded by an interior surface of the housing. This annular flow region is in fluid communication with the outlet port of the flow control module. The annular flow channel and annular flow region, with the aid of the above described flow body, maintain desirable laminar flow characteristics through the flow control module.

Turning now to FIG. 1, an embodiment of the above introduced flow control module 100 is illustrated. Flow control module 100 includes a housing 102 which has an inlet 104 and an outlet 106. A flow path extends between inlet 104 and outlet 106. A first solenoid assembly 108 is attached to an upper portion of flow control module 100 as illustrated in FIG. 1. A second solenoid assembly 110 is attached to a lower portion of flow control module 100 as illustrated in FIG. 1. As introduced above, first solenoid assembly 108 is an on/off solenoid assembly. Second solenoid assembly 110 is a proportional solenoid assembly or proportional control valve. Functionally, first solenoid assembly 108 is responsible for allowing or preventing flow from reaching the outlet side of flow control module 100. In other words, the first solenoid assembly 108 is configured to open to allow flow to reach the outlet side of the flow control module 100 and to close to prevent flow from reaching the outlet side of the flow control module 100. Second solenoid assembly 110 is responsible for proportionally controlling the flow to outlet 106 from the outlet side of flow control module 100. In the example shown in FIG. 1 the second solenoid assembly 110 is positioned between the first solenoid assembly 108 and the outlet 106. In some implementations, the positioning of the first solenoid assembly 108 and the second solenoid assembly 110 are reversed.

The first solenoid assembly 108 and the second solenoid assembly 110 may be configured as described in PCT App. No. PCT/US18/20673, entitled "Flow Control Module," filed Mar. 2, 2018, hereby incorporated by reference in its entirety.

A thermal mass flow meter 112 is disposed along the flow path between the inlet 104 and the first solenoid assembly 108. In some implementations, the thermal mass flow meter is a microelectromechanical systems (MEMS) thermal mass flow meter. The thermal mass flow meter 112 is configured to measure a flow rate of fluid passing through the flow path as well as a temperature of the fluid. In some implementations, the thermal mass flow meter 112 may be positioned along the flow path between the second solenoid assembly 110 and the outlet 106. By positioning the thermal mass flow meter 112 downstream of the on/off solenoid assembly 108, the sensor 112 is not subject to the pressure levels maintained by the fluid at the inlet 104. In various implementations, the sensor 112 is configured to meter liquids, including water or carbonated water, with a temperature range between 1 degrees Celsius to 32 degrees Celsius and a pressure between 0-225 psi.

Flow control module 100 is not limited to any particular application. Indeed, it may be utilized for the flow of any fluid with only minor application specific adjustments needed. As used herein, the term "fluid", means any liquid or gas. As one non-limiting example, flow control module 100 is ideally suited for use in controlling the flow of a fluid which must remain generally laminar. Such fluids include but are not limited to carbonated fluids (e.g., carbonated water with up to 12 volumes of carbonation) used for beverages or the like, where avoiding turbulence is desired to avoid out gassing.

Although not shown in FIG. 1, each of first and second solenoid assemblies 108, 110 are connected to a controller or the like which governs the actuation thereof. This may be a single controller which communicates with both of first and second solenoid assemblies 108, 110, or alternatively, separate controllers which are individually connected to each of first and second solenoid assemblies 108, 110. In either case, electrical current applied to either solenoid assemblies 108, 110 causes their respective armatures to linearly move relative to the remainder of the assembly.

Figure 2:
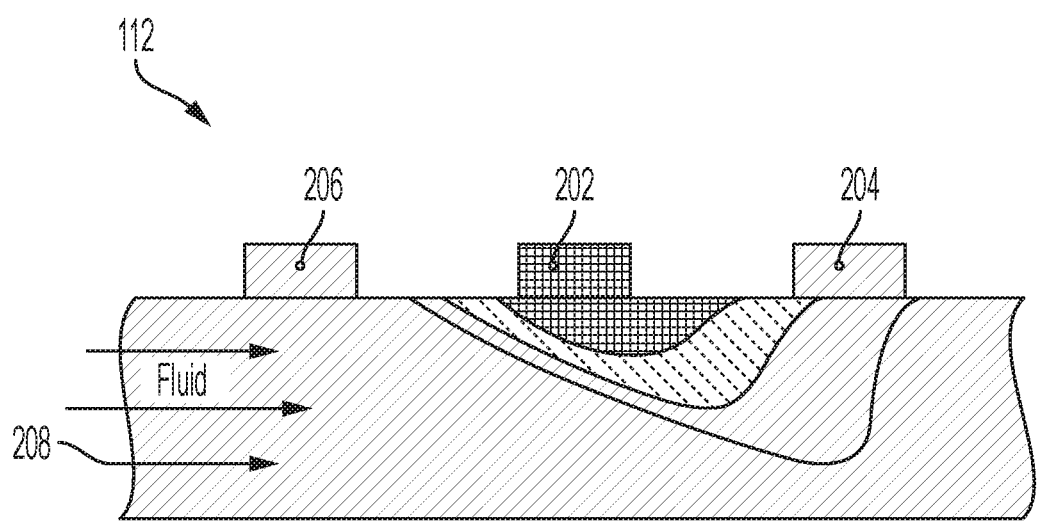
FIG. 2 is a cross-sectional view of a thermal mass flow meter in the flow control module according to FIG. 1.

FIG. 2 is a cross-sectional view of the thermal mass flow meter 112 in the flow control module 100 according to FIG. 1. The thermal mass flow meter 112 includes a heater 202, a downstream temperature sensor 204, and an upstream thermal sensor 206. The heater 202 is configured to introduce a known amount of heat into a fluid 208 flowing past the heater 202. In various implementations, the heater 202 is configured to introduce an amount of heat into the fluid to cause a temperature change in the fluid of less than 0.3 degrees Celsius. The upstream temperature sensor 206 and the downstream temperature sensor 204 are each configured to sense a temperature of the fluid 208 at their relative locations and provide a voltage or current output based on the sensed temperature of the fluid 208. For example, the downstream temperature sensor 204 is configured to provide a voltage or current output based upon the sensed temperature of the fluid 208 at a first location located towards the outlet 106 of the flow control module 100 relative to the heater 202. The upstream temperature sensor 206 is configured to provide a voltage or current output based upon the sensed temperature of the fluid 208 at a second location located towards the inlet 104 of the flow control module relative to the heater 202.

The upstream temperature sensor 206 may be positioned at a distance from the heater 202 that is equal to a distance between the heater and the downstream temperature sensor 204. The temperature sensors 204, 206 may be thermocouples, thermopiles, thermistors, and the like. In various implementations, the temperature sensors 204, 206 may be different types of temperature sensors or the same type of temperature sensor. Each of the heater 202, the downstream temperature sensor 204, and the upstream temperature sensor 206 are configured to be in fluid contact with the fluid 208. A seal (not shown) may be provided between the thermal mass flow meter 112 and the housing 102 in the flow path between the inlet 104 and the first solenoid assembly 108. The seal may be positioned around the fluid contact locations of the thermal mass flow meter 112, including the heater 202 and the temperature sensors 204, 206.

In various implementations, the temperature sensor 204 produces a voltage or current output based upon a relative difference between a surface of the temperature sensor 204 which is in fluid contact with the fluid 208 and an opposite surface of the temperature sensor 204. Likewise, the temperature sensor 206 produces a voltage or current output based upon a relative difference between a surface of the temperature sensor 206 which is in fluid contact with the fluid 208 and an opposite surface of the temperature sensor 206. A difference in the output from the temperature sensors 204, 206 is indicative of a temperature difference between the fluid 208 at the first and second locations. The difference in the output of the temperature sensors 204, 206 is therefore proportional to the amount of heat transferred from the heater 202 to the downstream temperature sensor 204 and thus proportional to the flow rate of the fluid 208.

In various implementations, the temperature sensors 204, 206 produce an output voltage or current indicative of the temperature of the fluid 208 itself (as opposed to a differential or relative temperature measurement described above). The output voltage or current from the temperature sensors 204, 206 may be directly correlated to the actual temperature of the fluid 208, such as through one or more temperature tables or transforms that correlate the output voltage or current to the temperature of the fluid 208. Different fluids 208 may have different thermal transfer characteristics and thus may have different associated temperature tables or transforms. For example, the temperature sensors 204, 206 may output a first voltage for a first temperature of a first fluid and may likewise output the first voltage for a second temperature of a second fluid that is different. In other words, the temperature sensors 204, 206 may output different voltages upon measuring the same temperature in different fluids.

In various implementations, the upstream temperature sensor 206 may be omitted. The downstream temperature sensor 206 may be used for measuring the flow rate of the fluid 208 when the heater 202 is on and for measuring a temperature of the fluid 208 when the heater 202 is off. In such an implementation, the heater 202 may be periodically cycled to be turned on to measure the flow rate of the fluid 208 and turned off to measure the temperature of the fluid 208.

Regardless of the specific implementation, the temperature sensors 204, 206 are configured to measure both a temperature of the fluid 208 as well as measure a flow rate of the fluid 208 (e.g., through a measurement of heat transfer from the heater 202 to the downstream temperature sensor 204).

Figure 3:
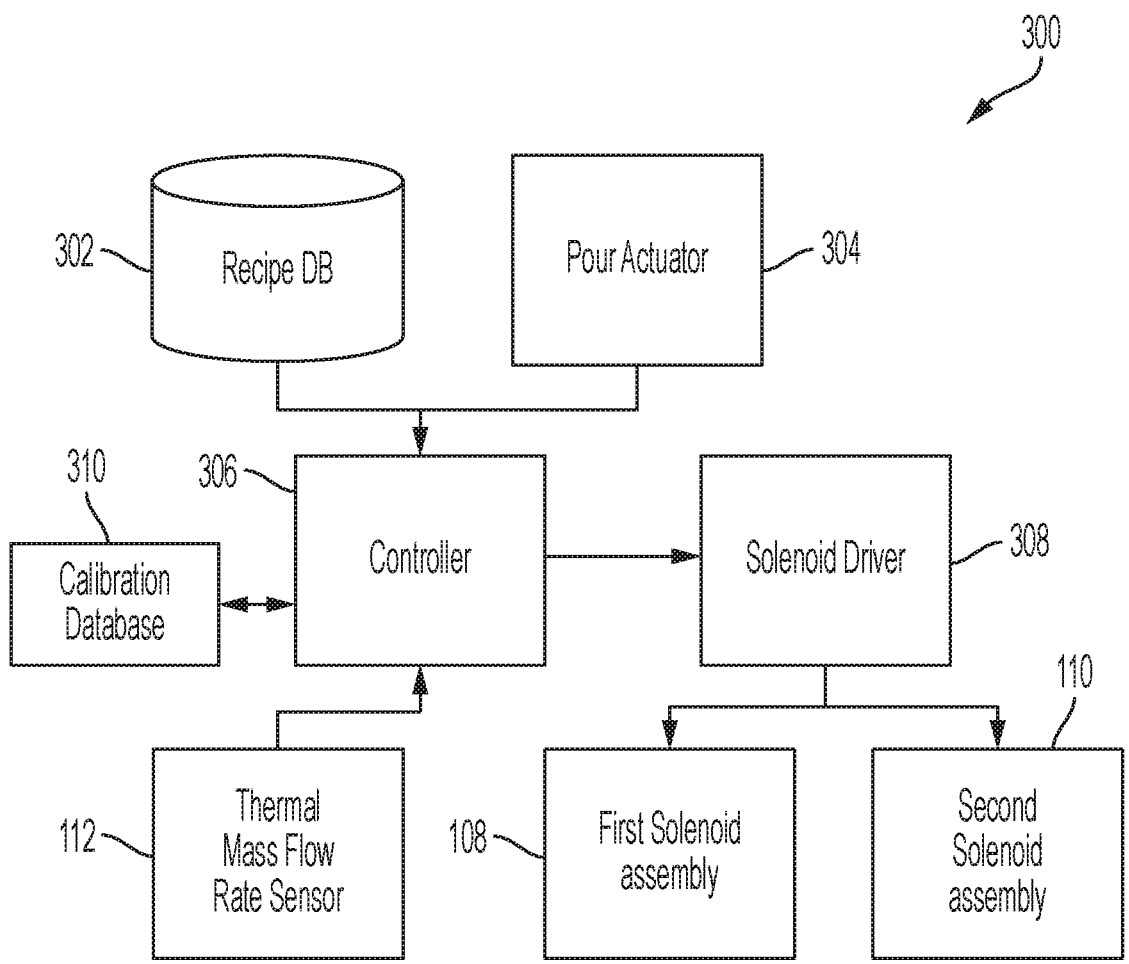
FIG. 3 is a block diagram of a control system including a controller for controlling the flow control module according to FIG. 1.

FIG. 3 is a block diagram of a control system 300 including a controller 306 for controlling the flow control module 100 according to FIG. 1. In use, the inlet 104 of the flow control module 100 may be installed in series with a fluid supply line for supplying a fluid to the flow control module 100. The flow control module is configured to modulate the flow rate of the fluid provided to the outlet 106, which in turn may be installed in series with a fluid output line. For example, in a beverage dispenser, the flow control module 100 may be installed in an ingredient line for modulating the flow rate of a beverage ingredient, such as water, carbonated water, sweetener, or other beverage ingredient before being dispensed from a nozzle.

A recipe database 302 provides a predetermined flow rate of the fluid to a controller 306. For example, in a beverage dispenser, the predetermined flow rate of the fluid may be based upon a beverage selected to be dispensed from the beverage dispenser. In some implementations, the predetermined flow rate of the fluid may change over time. In some implementations, the predetermined flow rate of the fluid may be maintained as part of a recipe for a selected beverage. The recipe may comprise a predetermined flow rate for each of a plurality of beverage ingredients. A pour actuator 304 provides an "on" signal to the controller 306 upon being actuated. For example, in a beverage dispenser, the pour actuator 304 may be a dispense button or lever actuated by an end-user of the beverage dispenser to initiate dispensing a beverage. The pour actuator 304 may be provided by any physical, virtual (e.g., icon in a touchscreen, etc.), or logical (e.g., automatically provided upon satisfying an operating condition) actuation to initiate a flow of the fluid.

Upon receiving the "on" signal, the controller 306 is configured to send a control signal to a solenoid driver 308, which in turn sends a control signal to the first solenoid assembly 108 such that first solenoid assembly 108 opens to allow the fluid to flow through the flow path of the flow control module 100. Additionally, upon receiving the "on" signal, the controller 306 sends a control signal to the solenoid driver 308 indicating a voltage level to drive the second solenoid assembly 110 to restrict a flow rate of the fluid through the flow control module 100 to approximately the predetermined rate.

As fluid flows through the flow path of the flow control module 100, the controller 306 receives a flow rate signal from the thermal mass flow meter 112 indicative of a measured flow rate of the fluid through the flow control module 100. For example, the flow rate signal may be a value of the measured flow rate determined by the thermal mass flow meter 112 itself or a voltage or current level sensed by the thermal mass flow meter 112. When the flow rate signal is a voltage or current level, the controller 306 uses one or more tables or transforms to convert the voltage or current level to the measured flow rate for the fluid. The controller 306 compares the measured flow rate of the fluid through the flow control module 100 based on the thermal mass flow meter 112 with the predetermined flow rate received from the database 302. Based on a difference between the measured flow rate and the predetermined flow rate, the controller 306 sends a control signal to the solenoid driver 108 indicating a voltage level to drive the second solenoid assembly 110 to change the flow rate of the fluid through the flow control module 100 to adjust for the difference. The controller 306 is configured to change the flow rate to increase or decrease the flow rate of the fluid through the flow control module 100.

Additionally, the controller 306 receives a temperature signal from the thermal mass flow meter 112 indicative of a measured temperature of the fluid through the flow control module 100. For example, the temperature signal may be a value of the measured temperature determined by the thermal mass flow meter 112 itself or a voltage or current level sensed by the thermal mass flow meter 112. When the temperature signal is a voltage or current level, the controller 306 uses one or more tables or transforms to convert the voltage or current level to the measured temperature of the fluid.

Some fluids may have different flow characteristics at different temperatures. For example, a fluid may be determined to have a first set of flow characteristics within a first temperature range and a second set of flow characteristics within a second temperature range. For example, for carbonated water in a beverage dispenser, the first temperature range may be for carbonated water that is cooled to be less than 50° F. and the second temperature range may be for carbonated water that is 50° F. or warmer. Carbonated water in beverage dispensers is maintained at a pressure of 4-8 bar, typically approximately 5 bar. While the transition temperature between the first and second temperature ranges is described above as being at 50° F., the transition temperature may be anywhere between 45° F.-55° F. for carbonated water. Other transition temperatures may be used for different fluids or different pressures. While only two different temperature ranges are described above, any number of temperature ranges may be used to specify different flow characteristics of a fluid at different temperatures.

A calibration database 310 maintains different sets of calibration parameters for controlling operation of the second solenoid assembly 110. Each set of calibration parameters tunes the operation of the second solenoid assembly 110 for accurate control of the flow rate of a fluid in a specific temperature range. For example, a set of calibration parameters may adjust a location of the armature of the second solenoid assembly 110 for a given flow rate (e.g., how far or how much the ports on the outer sleeve surrounding the armature are open or aligned for providing a given flow rate), how often adjustments are made to the flow rate, and/or how fast the armature moves when making adjustments to the flow rate. Other calibration parameters may be used without departing from the spirit or scope of this disclosure.

Following the example above, the calibration database 310 maintains a first set of calibration parameters for the first temperature range and a second set of calibration parameters for the second temperature range. For example, for carbonated water in the second temperature range, the carbonated water may have a higher pressure. To accommodate accurately controlling the flow rate of the carbonated water at the higher pressure, the second set of calibration parameters may control the second solenoid assembly 110 to position the armature to have a smaller opening or less alignment, to make less frequent adjustments to the flow rate, and/or to slow down how fast the armature moves when making adjustments to the flow rate as compared to the same values in the first set of calibration parameters.

Accordingly, when the controller 306 determines that the measured temperature of the fluid has transitioned from the first temperature range to the second temperature range, or vice versa, the controller 306 retrieves a different set of calibration parameters from the calibration database 310 and provides the different set of calibration parameters to the second solenoid assembly 110. Thereafter, the second solenoid assembly 110 operates based on the different set of calibration parameters.

For example, the second solenoid assembly 110 may initially operate to control the flow rate of the fluid with the first set of calibration parameters associated with the first temperature range. Based upon the measured temperature of the fluid from the thermal mass flow meter 112, the controller 306 determines that the temperature of the fluid has transitioned to the second temperature range. Accordingly, the controller 306 is configured to retrieve the second set of calibration parameters from the calibration database 310. The controller 306 provides the second set of calibration parameters to the second solenoid assembly 110. Thereafter, the second solenoid assembly 110 operates to control the flow rate of the fluid with the second set of calibration parameters associated with the second temperature range. Likewise, upon the fluid transitioning from the second temperature range to the first temperature range, the first set of calibration parameters may again be provided to the second solenoid assembly 110.

In some implementations, the second solenoid assembly 110 may locally maintain the first and second calibration parameters and operate based on one or the other set of the calibration parameters base upon a control signal received from the controller 306. In some implementations, the control signal received by the second solenoid assembly 110 from the controller 306 may simply indicate a current temperature of the fluid and internal logic of the second solenoid assembly may determine which calibration parameters to use for current operation. In some implementations, as an alternative to loading new calibration parameters on the second solenoid assembly 110, one or more control signals supplied by the controller 306 or solenoid driver 308 may be scaled or otherwise adjusted to account for the difference in the flow characteristics of a fluid at different temperatures.

Various alternatives to the control system 300 may be made without departing from the spirit or scope of this disclosure. For example, the controller 306 may be integrated in as part of the flow control module 100 or be provided as a separate component from the flow control module. For example, in the example of the beverage dispenser, the controller 306 may be provided as a controller of the beverage dispenser separate from the flow control module 100. In various implementations, the solenoid driver 308 may be optional or a separate solenoid driver 308 may be provided for each of the first and second solenoid assemblies 108, 110. Additionally, while a single controller 306 is shown in the example of FIG. 3, separate controllers may be provided for each of the first and second solenoid assemblies 108, 110. Any combination of the above variations is additionally contemplated by this disclosure.

In addition to adjusting the operation of the second solenoid assembly 110, upon the controller 306 determining that the measured temperature of the fluid has transitioned from the first temperature range to the second temperature range, a maintenance condition may be flagged. For example, in a beverage dispenser that is cooled by ice, determining that the measured temperature of the fluid is in the second temperature range is indicative that additional ice needs to be added to the dispenser or that an ice bridge has formed in the ice bin. The controller 306 may generate an ice alert for display via a user interface of the dispenser or through a notification communicated to an external device. For example, a maintenance LED on the dispenser or other visual indicator on the user interface of the dispenser may alert a crew member to service the dispenser. Upon entering a maintenance mode of operation, the dispenser may present the ice alert for display on the user interface of the dispenser. In other words, in addition to detecting the flow rate and temperature of beverage ingredients, such as water or carbonated water, the thermal mass flow meter 112 acts as an ice sensor for a beverage dispenser to detect the presence of ice.

Figure 4:
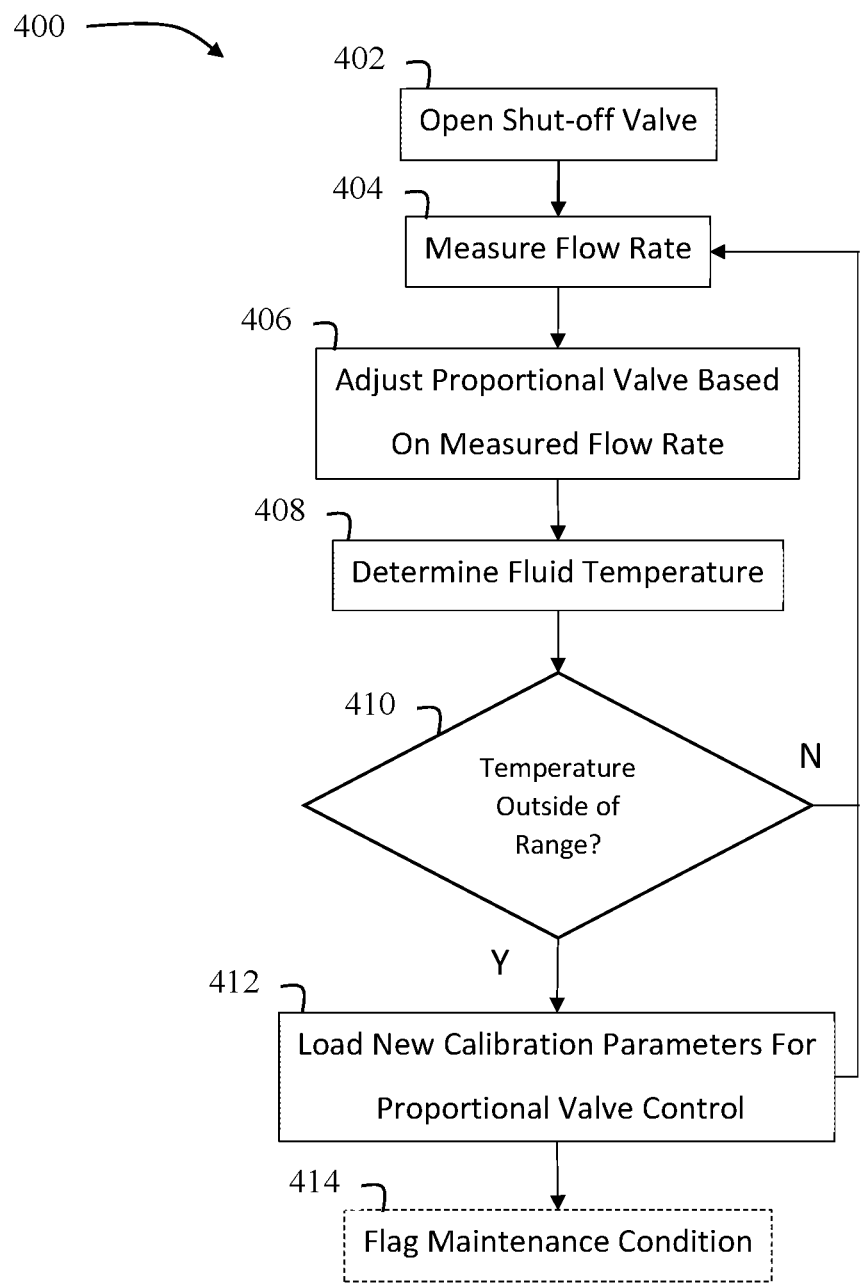
FIG. 4 is a flow diagram of a method of controlling the flow control module.

FIG. 4 is a flow diagram of a method 400 of controlling the flow control module 100. At 402, the controller 306 instructs the first solenoid assembly 108 to open to allow a flow of fluid through the flow path of the flow control module 100. At 404, the controller 306 receives a measurement of the flow rate of the fluid determined by the thermal mass flow meter 112 or determines the flow rate of the fluid based upon a flow rate signal received from the thermal mass flow meter 112. At 406, the controller 306 adjusts the second solenoid assembly 110 based on the measured flow rate. For example, based upon a difference between the measured flow rate and a desired flow rate, the controller 306 sends a control signal to the second solenoid assembly 110 to change the flow rate of the fluid through the flow control module 100 to adjust for the difference.

At 408, the controller 306 receives a measurement of the temperature of the fluid determined by the thermal mass flow meter 112 or determines the temperature of the fluid based upon a temperature signal received from the thermal mass flow meter 112. At 410, the controller 306 makes a determination of whether the measured temperature of the fluid is outside of a temperature range for the fluid. For example, if the second solenoid assembly 110 is operating based on the first set of calibration parameters, then the temperature range is the first temperature range (e.g., less than 50° F. for carbonated water). If the measured temperature is within the temperature range for the fluid, then the process repeats at step 404 until the controller 306 instructs the first solenoid assembly 108 to close to stop the flow of fluid through the flow control module 100.

Otherwise, at 412, if the measured temperature is outside of the temperature range for the fluid, then the controller 306 loads new calibration parameters for the second solenoid assembly 110 to modify the operation thereof. For example, upon the measured temperature being in the second temperature range (e.g., greater than 50° F. for carbonated water), the controller 306 loads the second set of calibration parameters for the second solenoid assembly 110. Operation continues at 404 to measure and adjust the flow rate of the fluid using the second set of calibration parameters for the second solenoid assembly 110.

Optionally, at 414, the controller 306 generates a maintenance alert based upon the determination that the measured temperature of the fluid is outside of a temperature range for the fluid. For example, the controller 306 generates the ice alert for a beverage dispenser to alert a crew member to add additional ice to the dispenser.

The thermal conductivity of air compared to most liquids is drastically different. For example, the thermal conductivity of air at 75° F. and 14.5 psia is 26.16 mW/m K whereas the thermal conductivity of water in the same conditions is 598.03 mW/m K. The thermal conductivity of other gases and liquids will vary, but most will maintain approximately an order of magnitude difference in thermal conductivity. Accordingly, the thermal mass flow meter 112 may also be leveraged to detect air bubbles in a liquid line or otherwise identify a change in a phase of the fluid (e.g., from liquid to gas, or vice versa).

Figure 5:
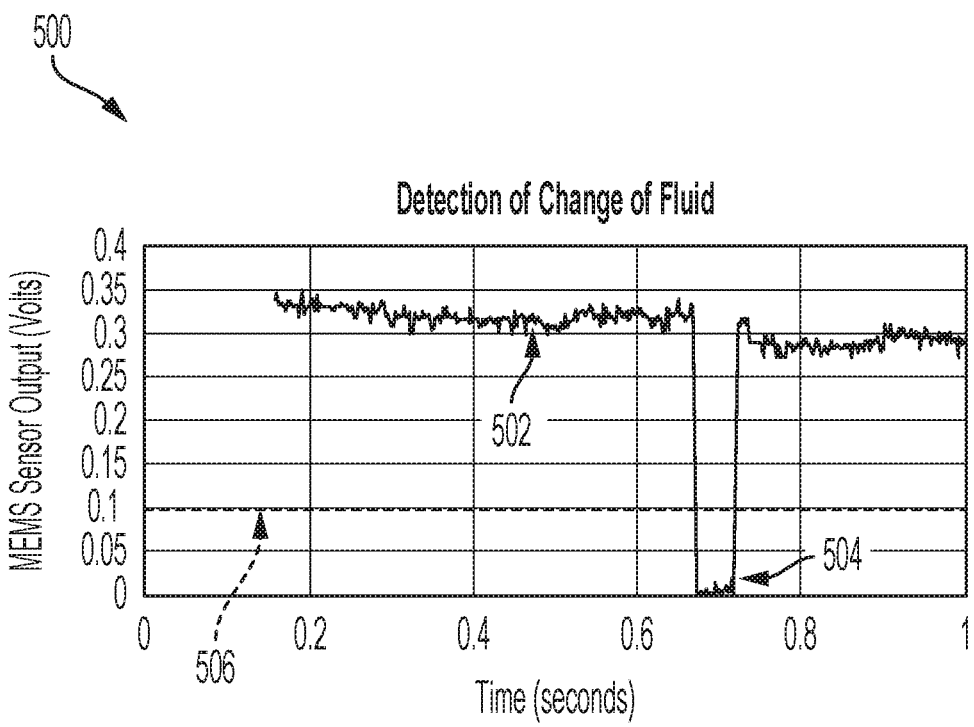
FIG. 5 is graph of a response of the thermal mass flow meter to a bubble in a liquid line.

FIG. 5 is graph 500 of a response of the thermal mass flow meter 112 to a bubble in a liquid line. As shown at 502, the output of the thermal mass flow meter 112 while a liquid, such as water, is flowing through the flow control module 100 may be in a range of between 0.25 to 0.35 volts. In contrast, as shown at 504, the output of the thermal mass flow meter 112 is shown while a gas, such as air, is flowing through the flow control module 100. As can be seen, the output of the thermal mass flow meter 112 provides a dramatically different voltage level while the gas is flowing through the flow control module 100, at least an order of magnitude lower than that when a liquid is flowing. This difference in the output of the thermal mass flow meter 112 is caused by the decrease in thermal transfer from the heater 202 to the downstream temperature sensor 204.

To accommodate the different thermal response characteristics of different liquids and gases that may flow through the flow control module 100, a threshold value 506 at an intermediate value between the anticipated outputs for liquids and gasses may be specified for detecting the transition between a liquid and a gas flowing through the flow control module 100. For example, the threshold value 506 may be set to two, three, four, five, or more times the anticipated output value for a gas. In the example shown, the threshold value is set to a value of 0.1 volts.

While the example above is provided with respect to a voltage flow rate signal provided from the thermal mass flow meter 112, a value of the measured flow rate determined by the thermal mass flow meter 112 may likewise be used. For example, dramatically different flow rate values may be determined by the thermal mass flow meter 112 based on whether a liquid or a gas may be present in the flow control module 100.

Accordingly, the controller 306 is additionally configured to detect bubbles flowing through the flow control module 100 based on the output of the thermal mass flow meter 112. That is, in addition to detecting the flow rate and temperature of a fluid, the thermal mass flow meter 112 acts as a bubble sensor to detect the presence of bubbles in a liquid flow. Upon the output of the thermal mass flow meter 112 being less than the threshold value 506, the controller 306 may determine that a gas is present. In some implementations, a gas is determined to be present by the controller 306 after the output of the thermal mass flow meter 112 is below the threshold value 506 for more than a threshold amount of time. For example, the threshold amount of time may be more than 0.01 seconds, more than 0.05 seconds, or more than 0.1 seconds. By additionally applying a threshold amount of time to the determination of whether a gas is present, transient signals or noise may be prevented from incorrectly detecting the presence of gas.

While an occasional bubble may be expected in normal operation, persistent detection of bubbles or the absence of a liquid altogether may be used as a flag for generating a maintenance alert. Accordingly, the controller 306 is configured to detect a threshold number of bubbles within a predetermined period of time based on the output of the thermal mass flow meter 112. For example, in a carbonated water line of a beverage dispenser, the presence of more than a threshold number of bubbles within a given period of time may be indicative of a maintenance condition in the beverage dispenser. For example, a carbonator of the beverage dispenser may require service or a carbon dioxide source may need to be replaced. Likewise, occasionally a carbonator may freeze and prevent or otherwise restrict the flow of fluid through a fluidic circuit. Such reduced flow or non-flow conditions may damage pumps or other components in the beverage dispenser. Accordingly, the controller 306 may instruct the beverage dispenser to discontinue operation upon detecting a flow rate lower than a threshold flow rate or upon detecting more than a threshold amount of gas within a predetermined period of time.

While the example is provided above for detecting bubbles in a liquid line, the thermal mass flow meter 112 may likewise be used to detect liquid in a gas line.

In addition to using the mass flow meter 112 in the flow control module as described above, the mass flow meter 112 disclosed herein may be used as a stand-alone sensor for detecting gas in a liquid line, or vice versa. For example, in a beverage dispenser, the thermal mass flow meter 112 may be used to detect when a beverage ingredient source has sold out or otherwise depleted its supply of beverage ingredient.

Figure 6:
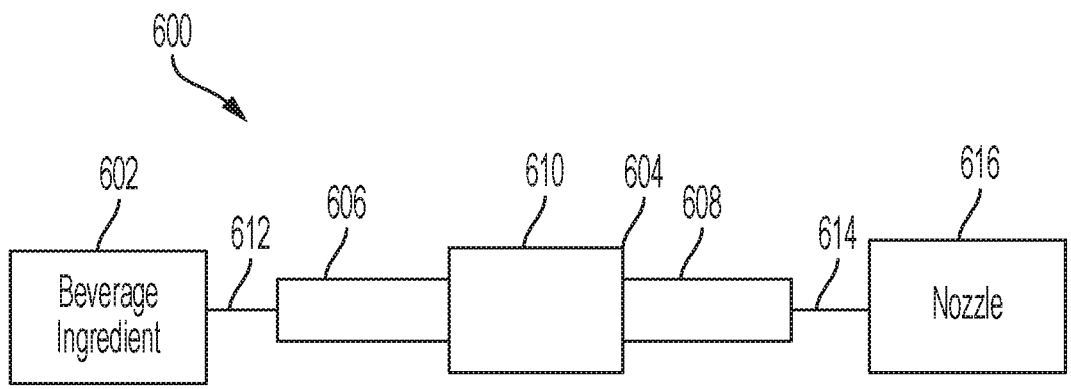
FIG. 6 is an exemplary fluidic circuit with a thermal mass flow sold out sensor according to the teachings herein.

FIG. 6 is an exemplary fluidic circuit 600 with a thermal mass flow out sensor 604 according to the teachings herein. A beverage ingredient source 602 may be fluidically coupled to an inlet 606 of the thermal mass flow out sensor 604 via a liquid line 612. Likewise, an outlet 608 of the thermal mass flow out sensor 604 is fluidically coupled to a nozzle 616 of the beverage dispenser via a liquid line 614. One or more pumps, valves, or other fluid metering devices (not shown) may be provided along the liquid lines 612, 614. The thermal mass flow out sensor 604 includes a housing 610 for accommodating the thermal mass flow meter 112 in fluid contact with a flow path between the inlet 606 and the outlet 608.

The thermal mass flow out sensor 604 may be in electrical communication with a controller (not shown), such as the controller 306 described above. The controller is configured to detect the presence of bubbles within the flow path of the thermal mass flow out sensor 604 based on an output of the thermal mass flow meter 112, as described above. Upon detecting a total threshold number of bubbles and/or upon detecting more than a threshold number of bubbles within a predetermined period of time, the controller is configured to determine that the beverage ingredient source 602 is sold-out or otherwise depleted its supply of beverage ingredient. The controller may additionally be configured to generate a sold-out alert for presentation on a user interface of the dispenser or an external device, similar to the ice alert described above.

While the sold-out sensor is described above in relation to a stand-alone sensor, the flow control module 100 may likewise operate as a sold-out sensor when installed in fluidic circuits with a limited supply of a beverage ingredient.

Figure 7:
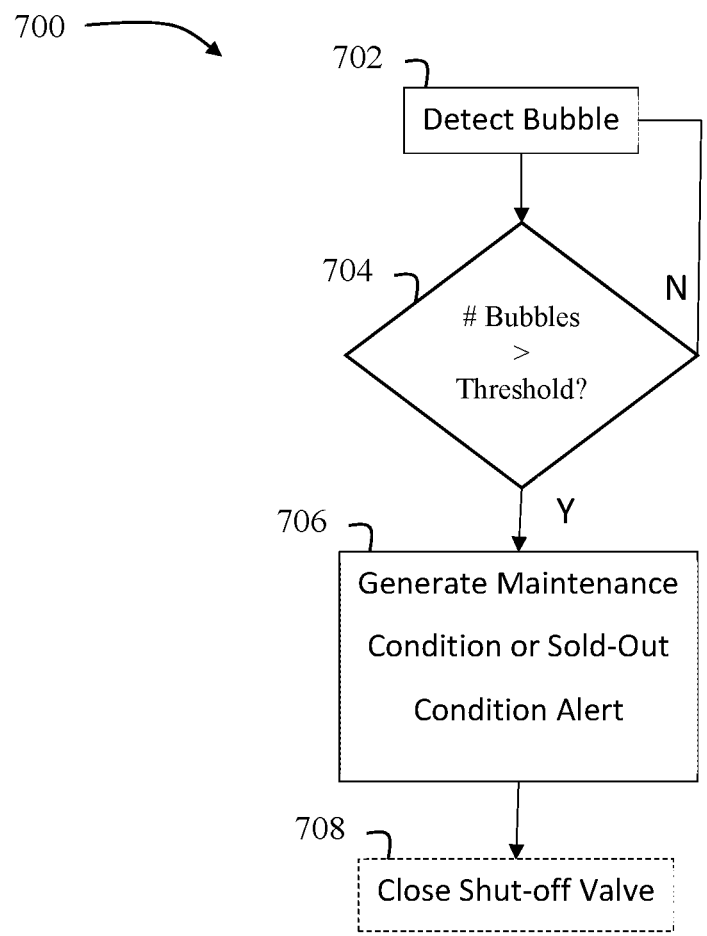
FIG. 7 is a flow diagram of a method of controlling the flow control module in the presence of detected bubbles.

FIG. 7 is a flow diagram of a method 700 of controlling the flow control module 100 in the presence of detected bubbles. At 702, the controller 306 detects a bubble, as described above. At 704, the controller determines whether a number of detected bubbles exceeds a threshold. For example, the controller 306 may determine whether a total threshold number of bubbles and/or a threshold number of bubbles within a predetermined period of time have been detected. Upon determining that the number of bubbles does not exceed the threshold, the controller 306 continues monitoring for the presence of bubbles in the flow control module 100.

Otherwise, at 706, the controller 306 generates a maintenance alert or sold-out alert. For example, when used in a carbonated water circuit in a beverage dispenser, the detection of more than the threshold number of bubbles may indicate a maintenance condition with the carbonator or other component of the dispenser. Likewise, when used in a beverage ingredient circuit with a limited supply of the beverage ingredient, the detection of more than the threshold number of bubbles may indicate that the beverage ingredient supply is depleted or otherwise sold-out. At 708, the controller 306 is optionally configured to send a control signal to the first solenoid assembly 108 to close the shut-off valve to prevent fluid from flowing through the flow control module 100. Closing the shut-off valve of the flow control module 100 may prevent damage, for example, to one or more components of a beverage dispenser or otherwise prevent dispensing a low-quality beverage (e.g., a beverage without a sufficient amount of a beverage ingredient).

In various embodiments, the flow control module 100 may be used within a beverage dispensing system to regulate the flow of one or more beverage ingredients. For example, a beverage dispensing system (which may include one or more macro-ingredients and one or more micro-ingredients) combines macro-ingredients (such as sweeteners, water, or carbonated water) and micro-ingredients (such as high intensity sweeteners, flavorings, food acids, or additives) to create a finished beverage. Such micro-dosing functionality may increase the dispensing capabilities of the beverage dispensing system to deliver a large variety of beverages and improve the quality of the beverage dispensed by the beverage dispensing system.

Generally described, the macro-ingredients may have reconstitution ratios in the range from full strength (no dilution) to about six (6) to one (1) (but generally less than about ten (10) to one (1)). As used herein, the reconstitution ratio refers to the ratio of diluent (e.g., water or carbonated water) to beverage ingredient. Therefore, a macro-ingredient with a 5:1 reconstitution ratio refers to a macro-ingredient that is to be dispensed and mixed with five parts diluent for every part of the macro-ingredient in the finished beverage. Many macro-ingredients may have reconstitution ratios in the range of about 3:1 to 5.5:1, including 4.5:1, 4.75:1, 5:1, 5.25:1, 5.5:1, and 8:1 reconstitution ratios.

The macro-ingredients may include sweeteners such as sugar syrup, HFCS ("High Fructose Corn Syrup"), FIS ("Fully Inverted Sugar"), MIS ("Medium Inverted Sugar"), mid-calorie sweeteners comprised of nutritive and non-nutritive or high intensity sweetener blends, and other such nutritive sweeteners that are difficult to pump and accurately meter at concentrations greater than about 10:1—particularly after having been cooled to standard beverage dispensing temperatures of around 35-45o F. An erythritol sweetener may also be considered a macro-ingredient sweetener when used as the primary sweetener source for a beverage, though typically erythritol will be blended with other sweetener sources and used in solutions with higher reconstitution ratios such that it may be considered a micro-ingredient as described below.

The macro-ingredients may also include traditional BIB ("bag-in-box") flavored syrups (e.g., COCA-COLA bag-in-box syrup) which contain all of a finished beverage's sweetener, flavors, and acids that when dispensed is to be mixed with a diluent source such as plain or carbonated water in ratios of around 3:1 to 6:1 of diluent to the syrup. Other typical macro-ingredients may include concentrated extracts, purees, juice concentrates, dairy products or concentrates, soy concentrates, and rice concentrates.

The macro-ingredient may also include macro-ingredient base products. Such macro-ingredient base products may include the sweetener as well as some common flavorings, acids, and other common components of a plurality of different finished beverages. However, one or more additional beverage ingredients (either micro-ingredients or macro-ingredients as described herein) other than the diluent are to be dispensed and mix with the macro-ingredient base product to produce a particular finished beverage. In other words, the macro-ingredient base product may be dispensed and mixed with a first micro-ingredient non-sweetener flavor component to produce a first finished beverage. The same macro-ingredient base product may be dispensed and mixed with a second micro-ingredient non-sweetener flavor component to produce a second finished beverage.

The macro-ingredients described above may be stored in a conventional bag-in-box container in, at and/or remote from the dispenser. The viscosity of the macro-ingredients may range from about 1 to about 10,000 centipoise and generally over 100 centipoises or so when chilled. Other types of macro-ingredients may be used herein.

The micro-ingredients may have reconstitution ratios ranging from about ten (10) to one (1) and higher. Specifically, many micro-ingredients may have reconstitution ratios in the range of about 20:1, to 50:1, to 100:1, to 300:1, or higher. The viscosities of the micro-ingredients typically range from about one (1) to about six (6) centipoise or so, but may vary from this range. In some instances, the viscosities of the micro-ingredients may be forty (40) centipoise or less. Examples of micro-ingredients include natural or artificial flavors; flavor additives; natural or artificial colors; artificial sweeteners (high potency, nonnutritive, or otherwise); antifoam agents, nonnutritive ingredients, additives for controlling tartness, e.g., citric acid or potassium citrate; functional additives such as vitamins, minerals, herbal extracts, nutraceuticals; and over the counter (or otherwise) medicines such as pseudoephedrine, acetaminophen; and similar types of ingredients. Various acids may be used in micro-ingredients including food acid concentrates such as phosphoric acid, citric acid, malic acid, or any other such common food acids. Various types of alcohols may be used as either macro- or micro-ingredients. The micro-ingredients may be in liquid, gaseous, or powder form (and/or combinations thereof including soluble and suspended ingredients in a variety of media, including water, organic solvents, and oils). Other types of micro-ingredients may be used herein.

Typically, micro-ingredients for a finished beverage product include separately stored non-sweetener beverage component concentrates that constitute the flavor components of the finished beverage. Non-sweetener beverage component concentrates do not act as a primary sweetener source for the finished beverage and do not contain added sweeteners, though some non-sweetener beverage component concentrates may have sweet tasting flavor components or flavor components that are perceived as sweet in them. These non-sweetener beverage component concentrates may include the food acid concentrate and food acid-degradable (or non-acid) concentrate components of the flavor, such as described in commonly owned U.S. patent application Ser. No. 11/276,553, entitled "Methods and Apparatus for Making Compositions Comprising and Acid and Acid Degradable Component and/or Compositions Comprising a Plurality of Selectable Components," which is herein incorporated by reference in its entirety. As noted above, micro-ingredients may have reconstitution ratios ranging from about ten (10) to one (1) and higher, where the micro-ingredients for the separately stored non-sweetener beverage component concentrates that constitute the flavor components of the finished beverage typically have reconstitution ratios ranging from 50:1, 75:1, 100:1, 150:1, 300:1, or higher.

For example, the non-sweetener flavor components of a cola finished beverage may be provided from separately stored first non-sweetener beverage component concentrate and a second non-sweetener beverage component concentrate. The first non-sweetener beverage component concentrate may comprise the food acid concentrate components of the cola finished beverage, such as phosphoric acid. The second non-sweetener beverage component concentrate may comprise the food acid-degradable concentrate components of the cola finished beverage, such as flavor oils that would react with and impact the taste and shelf life of a non-sweetener beverage component concentrate were they to be stored with the phosphoric acid or other food acid concentrate components separately stored in the first non-sweetener component concentrate. While the second non-sweetener beverage component concentrate does not include the food acid concentrate components of the first non-sweetener beverage component concentrate (e.g., phosphoric acid), the second non-sweetener beverage component concentrate may still be a high-acid beverage component solution (e.g., pH less than 4.6).

A finished beverage may have a plurality of non-sweetener concentrate components of the flavor other than the acid concentrate component of the finished beverage. For example, the non-sweetener flavor components of a cherry cola finished beverage may be provided from the separately stored non-sweetener beverage component concentrates described in the above example as well as a cherry non-sweetener component concentrate. The cherry non-sweetener component concentrate may be dispensed in an amount consistent with a recipe for the cherry cola finished beverage. Such a recipe may have more, less, or the same amount of the cherry non-sweetener component concentrate than other recipes for other finished beverages that include the cherry non-sweetener component concentrate. For example, the amount of cherry specified in the recipe for a cherry cola finished beverage may be more than the amount of cherry specified in the recipe for a cherry lemon-lime finished beverage to provide an optimal taste profile for each of the finished beverage versions. Such recipe-based flavor versions of finished beverages are to be contrasted with the addition of flavor additives or flavor shots as described below.

Other typical micro-ingredients for a finished beverage product may include micro-ingredient sweeteners. Micro-ingredient sweeteners may include high intensity sweeteners such as aspartame, Ace-K, steviol glycosides (e.g., Reb A, Reb M), sucralose, saccharin, or combinations thereof. Micro-ingredient sweeteners may also include erythritol when dispensed in combination with one or more other sweetener sources or when using blends of erythritol and one or more high intensity sweeteners as a single sweetener source.

Other typical micro-ingredients for supplementing a finished beverage product may include micro-ingredient flavor additives. Micro-ingredient flavor additives may include additional flavor options that can be added to a base beverage flavor. The micro-ingredient flavor additives may be non-sweetener beverage component concentrates. For example, a base beverage may be a cola flavored beverage, whereas cherry, lime, lemon, orange, and the like may be added to the cola beverage as flavor additives, sometimes referred to as flavor shots. In contrast to recipe-based flavor versions of finished beverages, the amount of micro-ingredient flavor additive added to supplement a finished beverage may be consistent among different finished beverages. For example, the amount of cherry non-sweetener component concentrate included as a flavor additive or flavor shot in a cola finished beverage may be the same as the amount of cherry non-sweetener component concentrate included as a flavor additive or flavor shot in a lemon-lime finished beverage. Additionally, whereas a recipe-based flavor version of a finished beverage is selectable via a single finished beverage selection icon or button (e.g., cherry cola icon/button), a flavor additive or flavor shot is a supplemental selection in addition to the finished beverage selection icon or button (e.g., cola icon/button selection followed by a cherry icon/button selection).

As is generally understood, such beverage selections may be made through a touchscreen user interface or other typical beverage user interface selection mechanism (e.g., buttons) on a beverage dispenser. The selected beverage, including any selected flavor additives, may then be dispensed upon the beverage dispenser receiving a further dispense command through a separate dispense button on the touchscreen user interface or through interaction with a separate pour mechanism such as a pour button (electromechanical, capacitive touch, or otherwise) or pour lever.

In the traditional BIB flavored syrup delivery of a finished beverage, a macro-ingredient flavored syrup that contains all of a finished beverage's sweetener, flavors, and acids is mixed with a diluent source such as plain or carbonated water in ratios of around 3:1 to 6:1 of diluent to the syrup. In contrast, for a micro-ingredient delivery of a finished beverage, the sweetener(s) and the non-sweetener beverage component concentrates of the finished beverage are all separately stored and mixed together about a nozzle when the finished beverage is dispensed. Example nozzles suitable for dispensing of such micro-ingredients include those described in commonly owned US provisional patent application Ser. No. 62/433,886, entitled "Dispensing Nozzle Assembly," PCT patent application Ser. No. PCT/US15/026657, entitled "Common Dispensing Nozzle Assembly," U.S. Pat. No. 7,866,509, entitled "Dispensing Nozzle Assembly," or U.S. Pat. No. 7,578,415, entitled "Dispensing Nozzle Assembly," which are all herein incorporated by reference in their entirety.

In operation, the beverage dispenser may dispense finished beverages from any one or more of the macro-ingredient or micro-ingredient sources described above. For example, similar to the traditional BIB flavored syrup delivery of a finished beverage, a macro-ingredient flavored syrup may be dispensed with a diluent source such as plain or carbonated water to produce a finished beverage. Additionally, the traditional BIB flavored syrup may be dispensed with the diluent and one or more micro-ingredient flavor additives to increase the variety of beverages offered by the beverage dispenser.

Micro-ingredient-based finished beverages may be dispensed by separately dispensing each of the two or more non-sweetener beverage component concentrates of the finished beverage along with a sweetener and diluent. The sweetener may be a macro-ingredient sweetener and/or a micro-ingredient sweetener and the diluent may be water and/or carbonated water. For example, a micro-ingredient-based cola finished beverage may be dispensed by separately dispensing food acid concentrate components of the cola finished beverage, such as phosphoric acid, food acid-degradable concentrate components of the cola finished beverage, such as flavor oils, macro-ingredient sweetener, such as HFCS, and carbonated water. In another example, a micro-ingredient-based diet-cola finished beverage may be dispensed by separately dispensing food acid concentrate components of the diet-cola finished beverage, food acid-degradable concentrate components of the diet-cola finished beverage, micro-ingredient sweetener, such as aspartame or an aspartame blend, and carbonated water. As a further example, a mid-calorie micro-ingredient-based cola finished beverage may be dispensed by separately dispensing food acid concentrate components of the mid-calorie cola finished beverage, food acid-degradable concentrate components of the mid-calorie cola finished beverage, a reduced amount of a macro-ingredient sweetener, a reduced amount of a micro-ingredient sweetener, and carbonated water. By reduced amount of macro-ingredient and micro-ingredient sweeteners, it is meant to be in comparison with the amount of macro-ingredient or micro-ingredient sweetener used in the cola finished beverage and diet-cola finished beverage. As a final example, a supplemental flavored micro-ingredient-based beverage, such as a cherry cola beverage or a cola beverage with an orange flavor shot, may be dispensed by separately dispensing a food acid concentrate components of the flavored cola finished beverage, food acid-degradable concentrate components of the flavored cola finished beverage, one or more non-sweetener micro-ingredient flavor additives (dispensed as either as a recipe-based flavor version of a finished beverage or a flavor shot), a sweetener (macro-ingredient sweetener, micro-ingredient sweetener, or combinations thereof), and carbonated water. While the above examples are provided for carbonated beverages, they apply to still beverages as well by substituting carbonated water with plain water.

The various ingredients may be dispensed by the beverage dispenser in a continuous pour mode where the appropriate ingredients in the appropriate proportions (e.g., in a predetermined ratio) for a given flow rate of the beverage being dispensed. In other words, as opposed to a conventional batch operation where a predetermined amount of ingredients are combined, the beverage dispenser provides for continuous mixing and flows in the correct ratio of ingredients for a pour of any volume. This continuous mix and flow method can also be applied to the dispensing of a particular size beverage selected by the selection of a beverage size button by setting a predetermined dispensing time for each size of beverage.

Figure 8:
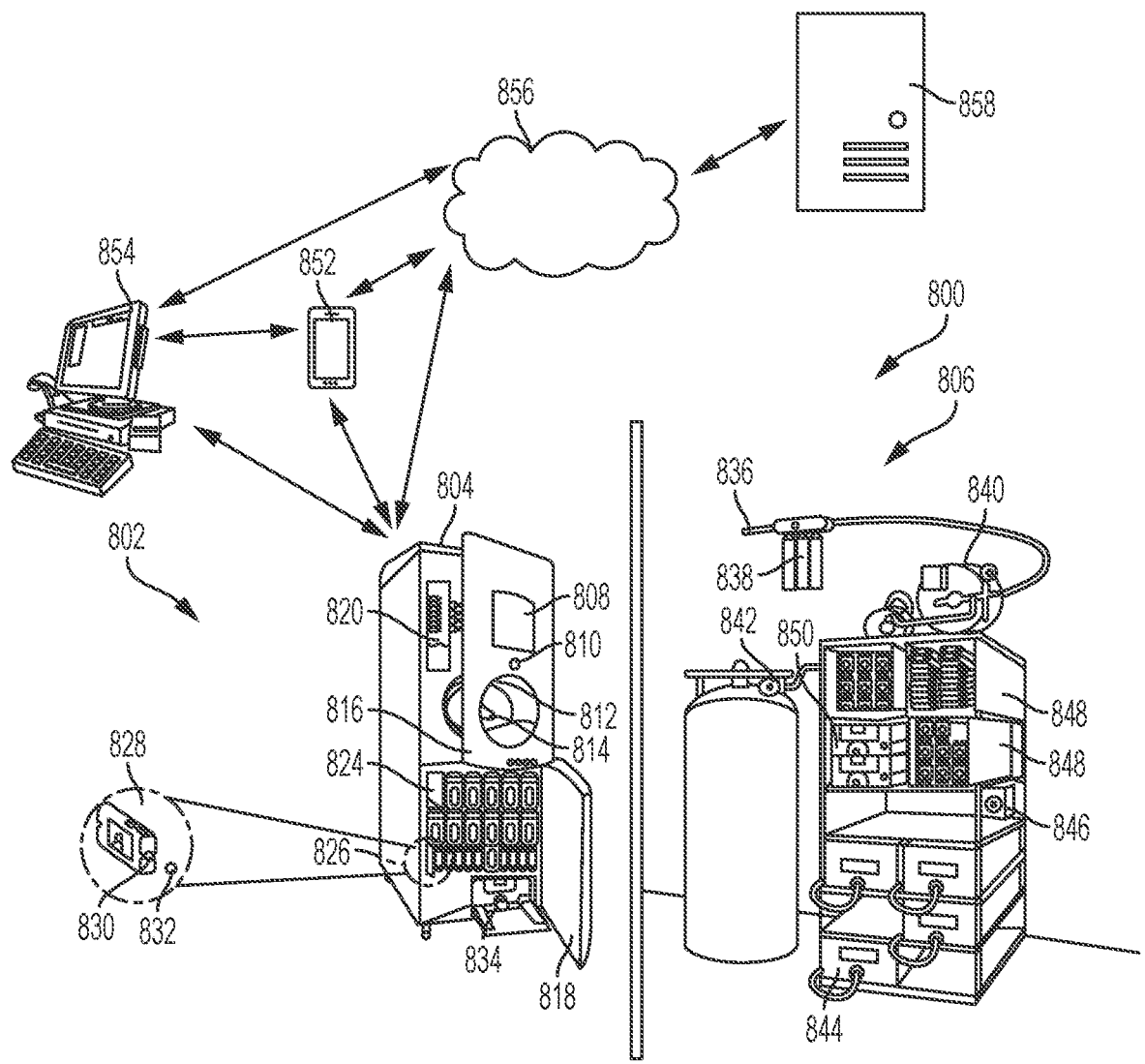
FIG. 8 is an exemplary beverage dispenser system according to the teachings herein.

FIG. 8 illustrates an exemplary beverage dispenser system 800 suitable for implementing the several embodiments of the disclosure. As shown, the beverage dispenser system 800 is configured as an ice cooled beverage dispenser. Other configurations of beverage dispensers are contemplated by this disclosure such as a drop-in ice-cooled beverage dispenser, a counter electric beverage dispenser, a remote recirculation beverage dispenser, or any other beverage dispenser configuration.

The beverage dispenser system 800 includes a front room system 802 with a beverage dispenser 804 and a back room system 806. The beverage dispenser 804 includes a user interface 808, such as a touchscreen display, to facilitate selection of the beverage to be dispensed. The user interface 808 may employ various screens to facilitate user interactions on the beverage dispenser 804 and/or receive a user profile through interaction with a user's mobile device 852, such as described in commonly owned U.S. patent application Ser. No. 14/485,826, entitled "Product Categorization User Interface for a Dispensing Device," which is herein incorporated by reference in its entirety.

Upon receiving a beverage selection via the user interface 808, a pour button 810 may be activated to dispense the selected beverage from the beverage dispenser 804 via a nozzle 814. For example, the pour button 810 may be an electromechanical button, capacitive touch button, or other button selectable by a user to activate the beverage dispenser 804 to dispense a beverage. While shown as a button, the pour button 810 may alternatively be implemented as a lever or other mechanism for activating the beverage dispenser 804 to dispense a beverage. As shown in FIG. 8, the pour button 810 is separate from the user interface 808. In some implementations, the pour button 810 may be implemented as a selectable icon in the user interface 808.

In some implementations, the beverage dispenser may also include an ice lever 814. Upon being activated, the ice lever 814 may cause the beverage dispenser 804 to dispense ice through an ice chute (not shown). For beverage dispensers that do not have an ice bin, such as counter-electric or remote recirculation beverage dispensers, the ice lever 814 may be omitted.

The beverage dispenser 804 may be secured via a primary door 816 and an ingredient door 818. The primary door 816 and the ingredient door 818 may be secured via one or more locks. In some implementations, the locks are a lock and key. In some implementations, the lock on the ingredient door 818 may be opened via an RFID reader (not shown) reading an authorize ingredient package 828. The primary door 816 may secure electronic components of the beverage dispenser 804 including one or more controllers 820. The ingredient door 818 may secure an ingredient compartment that houses an ingredient matrix 824.

The ingredient matrix 824 includes a plurality of slots 826 for receiving ingredient packages 828. In various implementations, the ingredient packages 828 may be micro-ingredient cartridges. The micro-ingredient cartridges may be single cartridges or double cartridges, such as described in commonly owned U.S. patent application Ser. No. 14/209,684, entitled "Beverage Dispenser Container and Carton," and U.S. patent application Ser. No. 12/494,427, entitled "Container Filling Systems and Methods," which are both herein incorporated by reference in their entirety. As shown in FIG. 8, there are three drawers of ingredients in the ingredient matrix 824. One or more of the drawers may slide back and forth along a rail so as to periodically agitate the ingredients housed on the drawer. Other configurations of the ingredient matrix 824 are possible, such as via one or more static and/or agitated ingredient towers.

Each ingredient package 828 may comprise an RFID tag, a fitment 830, and a fitment seal 832. The fitment seal 832 may be removed prior to installation into the beverage dispenser 804. Upon installation, the fitment 830 may engage with and provide a fluidic communication between a probe (not shown) in the slot 826 and the ingredients contained in the ingredient package 828. The ingredient matrix 824 may also contain one or more large volume micro-ingredient packages 834, such as for one or more micro-ingredient sweetener sources.

The beverage dispenser 804 may also include a carbonator (not shown) for receiving water and carbon dioxide to produce carbonated water. The beverage dispenser 804 may also include one or more heat exchangers (not shown), such as a cold plate, for cooling one or more of the beverage ingredients contained in or received by the beverage dispenser 804. In some implementations, one or more of the micro-ingredients dispensed via the nozzle 812 are not cooled via the heat exchanger or are otherwise maintained at an ambient temperature. Macro-ingredients dispensed via the nozzle 812 are typically cooled via the heat exchanger prior to being dispensed.

The back room system 806 is typically located in a back room remote from the front room system 802, such as a storage area in a merchant location. The back room system 806 includes a water source 836 such as a municipal water supply that provides a pressurized source of plain water. The water received via the water source 836 may be filtered or otherwise treated by a water treatment system 838. The treated water may optionally be pressurized to a desired pressure with a water booster 840 and supplied to the beverage dispenser. A carbon dioxide source 842 may supply carbon dioxide to the beverage dispenser 804.

One or more macro-ingredient sources 844 may be located in the back room. The macro-ingredient from each macro-ingredient source 844 may be supplied to the beverage dispenser 804 via a pump 846. The pump 846 may be a controlled gear pump, diaphragm pump, BIB pump, or any other suitable pump for supplying macro-ingredients to the beverage dispenser 804. The back room system 806 may also include a rack with one or more storage locations 848 for spare micro-ingredients and one or more storage locations 850 for spare macro-ingredients.

The beverage dispenser 804 may include one or more network interfaces for communicating directly with devices in the front room or the back room, communicating with devices in the front room or the back room in a local area network (LAN), or communicating with devices remote from a location with the beverage dispenser system 800 via a wide area network (WAN) connection. For example, the beverage dispenser 804 may include networking devices such as a near field communication (NFC) module, a BLUETOOTH module, a Wi-Fi module, a cellular modem, an Ethernet module, and the like. The beverage dispenser 804 may communicate via a direct communication or via a LAN with a user's mobile device 852 or a point-of-sale (POS) device 854 to receive a beverage selection or user profile of a user for configuring the beverage dispenser 804 to dispense one or more beverages based on the beverage selection or user profile. The user profile may include stored favorite beverages for the user, mixed or blended beverages created or stored by the user in their profile, and/or one or more beverage preferences, such as preferred nutritive level. The beverage dispenser 804 may also communicate via a WAN 856 for communicating with one or more remote servers 858 to receive software updates, content updates, user profiles, or beverage selections made via the remote server 858.

Figure 9:
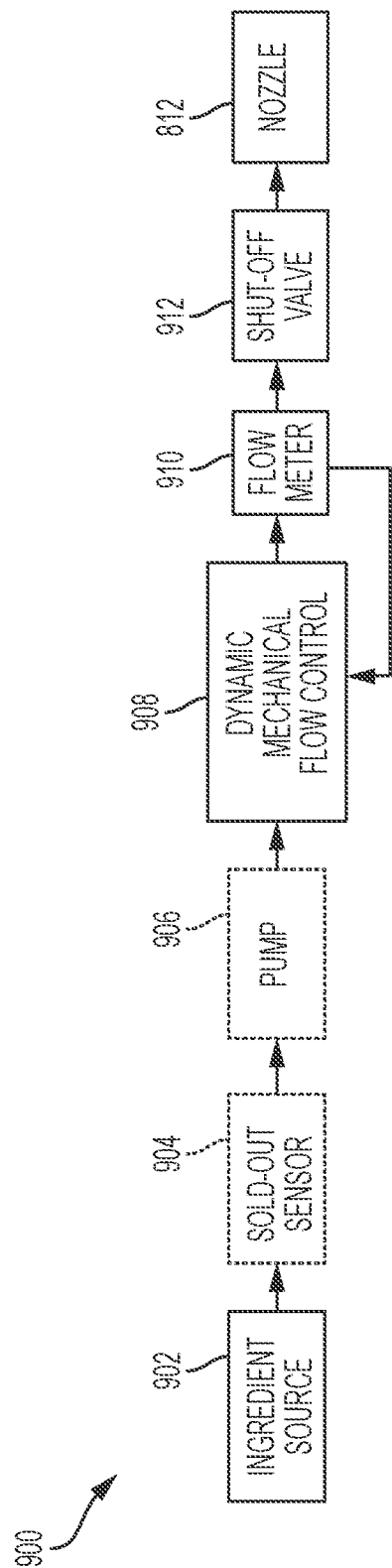
FIG. 9 is an exemplary fluidic circuit with the flow control module according to the teachings herein.

FIG. 9 illustrates an exemplary fluidic circuit 900 with pumping or metering devices from ingredient source 902 to the nozzle 812 of the beverage dispenser 904. For each ingredient source, the beverage dispenser 904 may include the fluidic circuit shown in FIG. 9. For example, the fluidic circuit for one or more of the macro-ingredient sources may include the fluidic circuit shown in FIG. 9. In some implementations, the fluidic circuit for the carbonated water and/or the still water source may include the fluidic circuit shown in FIG. 9.

FIG. 9 illustrates an exemplary fluidic circuit 900 with a dynamic mechanical flow control 908, a flow meter 910, and a shut-off valve 912 suitable for implementing the several embodiments of the disclosure. The dynamic mechanical flow control 908 receives a pressurized beverage ingredient from an ingredient source 902 and provides an adjustable flow rate of the beverage ingredient to the nozzle 812. The dynamic mechanical flow control 908 may include a variable sized orifice that adjusts to dynamically change the flow rate of the beverage ingredient supplied to the nozzle 812 based on control signals provided by the one or more controllers 820. A flow meter 910 downstream of the dynamic mechanical flow control 908 measures a flow rate of the beverage ingredient being supplied by the dynamic mechanical flow control 908 and provides a feedback loop to the dynamic mechanical flow control 908 for controlling the variable sized orifice. A shut-off valve 912 downstream of the dynamic mechanical flow control 908 may be actuated to open and close in order to dispense or prevent dispensing the beverage ingredient from the nozzle 812. In various implementations, the dynamic flow control module 908, the flow meter 910, and the shut-off valve 912 may be substituted for the flow control module 100 as described herein. As discussed above, the flow control module 100 has a different order of components that shown for the dynamic flow control module 908, the flow meter 910, and the shut-off valve 912 in FIG. 9.

The ingredient source 902 may be a micro-ingredient source or a macro-ingredient source housed in the ingredient matrix 824 of the beverage dispenser 904, remote from the beverage dispenser 904 in the front room (e.g., adjacent to the beverage dispenser 904 or under a counter on which the beverage dispenser 904 is located), or located in the back room. The ingredient source 902 may also be the municipal water supply 836 or other pressurized ingredient source. When the ingredient source 902 is not pressurized, the fluidic circuit 900 may include a pump 906 for pressurizing the beverage ingredient from the ingredient source 902. The pump 906 may be any pump suitable for pressurizing the beverage ingredient from the ingredient source 902, such as a BIB pump, CO2 driven pump, controlled gear pump, or positive displacement pump. The fluidic circuit 900 may also optionally include a sold-out sensor 904 for detecting when the ingredient source 902 is empty.

While the components of the fluidic circuit 900 are shown in a particular order in, any order of the components described above may be used. Other variations are readily recognizable by those of ordinary skill in the art. Additionally, one or more heat exchangers (not shown) may be used at any location in the fluidic circuit 900. The heat exchanger may include an ice bin, water bath, cold plate, or remote recirculation system.

Figure 10:
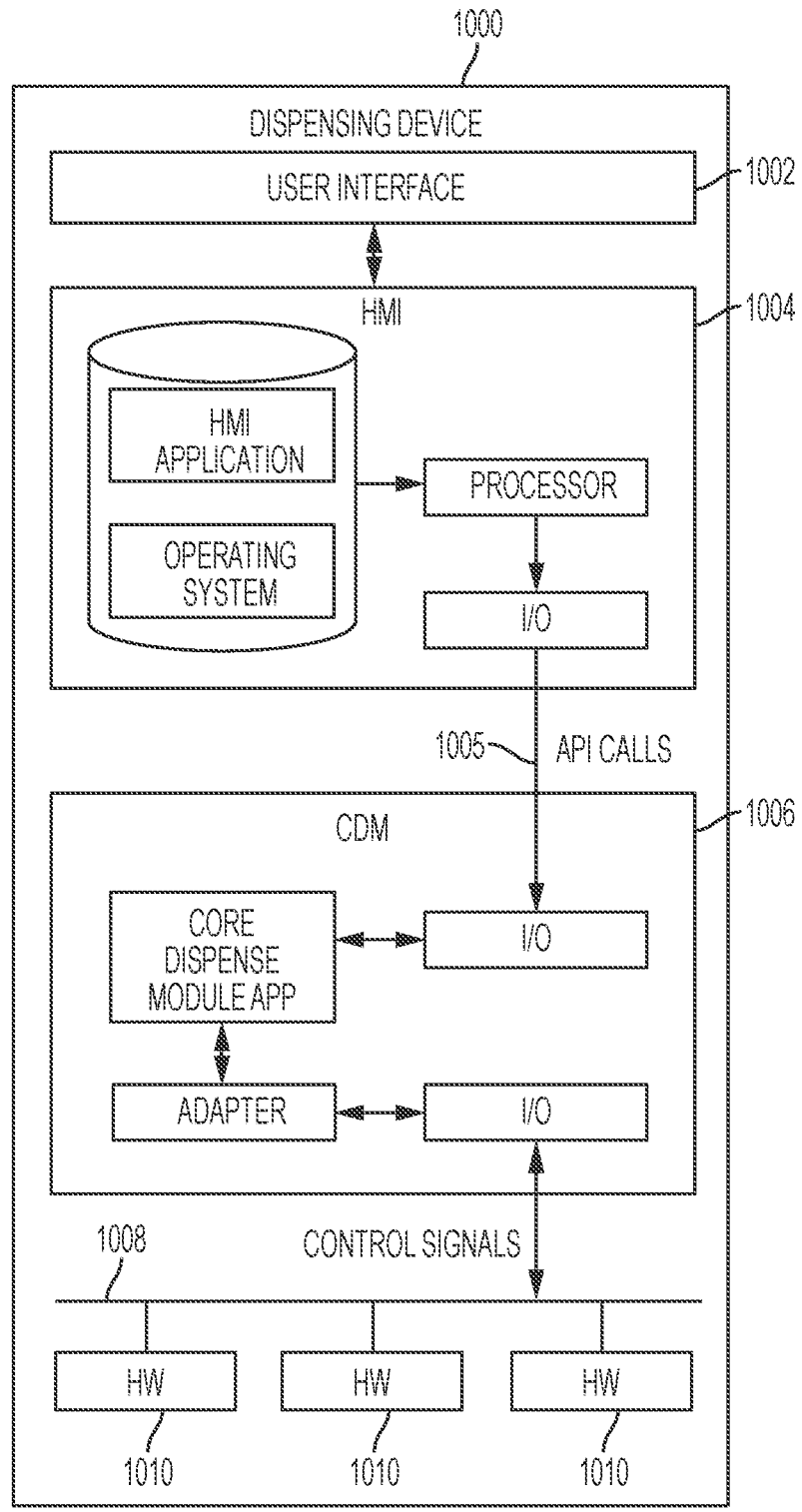
FIG. 10 is an exemplary block diagram of a control architecture for a beverage dispenser according to the teachings herein.

FIG. 10 illustrates an exemplary block diagram of a control architecture 1000 that may be used to control the beverage dispenser 804 suitable for implementing the several embodiments of the disclosure. As shown in FIG. 10, control architecture 1000 may comprise a core dispense module (CDM) 1006, a human machine interface (HMI) module 1004, a user interface (UI) 1002, and a machine bus (MBUS) 1005. HMI 1004 may connect to or otherwise interface and communicate with at least one external device (e.g., mobile device 852 or POS 854) being external to beverage dispenser 804. HMI 1004 may also control and update display screens on UI 1002. CDM 1006 may control flows from a plurality of pumps and/or valves 1010 in beverage dispenser 804 according to a recipe to mix and dispense a product (e.g., a beverage) from beverage dispenser 804. For example, the CDM 1006 may control the flow of a beverage ingredient through the flow control module 100. In various implementations, the controller 306 may be embodied in the CDM 1006 or one or more of the pumping or metering devices 1010.

Beverage ingredients (e.g., micro-ingredients, macro-ingredients, and/or diluents) may be combined to dispense various products that may include beverages or blended beverages (i.e., finished beverage products) from beverage dispenser 804. However, beverage dispenser 804 may also be configured to dispense beverage components individually.

An example of control architecture 1000 for beverage dispenser 804 may be described in U.S. Ser. No. 61/987,020, entitled "Dispenser Control Architecture", filed on May 1, 2014, the entirety of which is hereby incorporated by reference. MBUS 1005 may facilitate communication between HMI 1004 and CDM 1006 via one or more API calls. HMI 1004, MBUS 1005, and CDM 1006 may collectively comprise common core components, implemented as hardware or as combination of hardware and software, which may be adapted to provide customized functionality in beverage dispenser 804. Beverage dispenser 804 may further include memory storage and a processor. Examples of UI 1002 may be described in U.S. Ser. No. 61/877,549, entitled "Product Categorization User Interface for a Dispensing Device", filed on Sep. 13, 2013, the entirety of which is hereby incorporated by reference.

UI 1002 may detect what area of a touch screen has been touched by a user (e.g., user 108). In response, UI 1002 may send HMI 1004 data regarding where the touch screen was touched. In response, HMI 1004 may interpret this received data to determine whether to have UI 1002 display a different UI screen or to issue a command to CDM 1006. For example, HMI 1004 may determine that the user touched a portion of the touch screen corresponding to a beverage brand. In response, HMI 1004 may issue a command to CDM 1006 to pour the corresponding beverage brand. In response to receiving the command to pour the corresponding beverage brand, the CDM 1006 in turn issues commands via one or more control buses 1008 to the pumping or metering devices 1010 for the beverage ingredients needed to dispense the beverage brand. Or HMI 1004 may determine that the user touched a portion of the touch screen corresponding to a request for another screen. In response, HMI 1004 may cause UI 1002 to display the requested screen.

For example, the CDM 1006 issues commands via a control bus 1008 to the flow control module 100 in response to receiving a command to pour a selected beverage brand, as described above in conjunction with FIGS. 10-12. For example, the controller 106 may be implemented by the CDM 1006. Alternatively, the CDM 1006 may issue commands via the control bus to the controller 106 for controlling operation of the flow control module 100. Upon the HMI 1004 receiving a selection of a beverage brand, the CDM 1006 may obtain a recipe for the selected beverage from the recipe database 102. Upon the HMI 1004 receiving a command to pour the beverage (e.g., pour actuator 104 indicates an "on" status), the CDM 1006 sends a signal to a solenoid driver 108, which in turn sends a signal to the first solenoid assembly 108 such that first solenoid assembly 108 causes the flow control module 100 to flow (e.g., the on/off solenoid assembly 108 turns on and opens armature 46 so that the flow may proceed into passageway 54). Additionally, the CDM 1006 sends a signal to the solenoid driver indicating a voltage level to drive the second solenoid assembly 110 so that it releases a flow at the predetermined rate (e.g., armature 66 is acted upon by coil 58 such that it moves to allow the flow at the predetermined rate). CDM 1006 compares the predetermined flow rate with a signal from the flow meter 92, which detects the actual flow rate through the inlet orifice 24 and adjusts the voltage level to drive the second solenoid assembly 110 accordingly throughout the dispense of the beverage in accordance with the recipe.

In some embodiments, UI 1002 in beverage dispenser 804 may be utilized to select and individually dispense one or more beverages. The beverages may be dispensed as beverage components in a continuous pour operation whereby one or more selected beverage components continue to be dispensed while a pour input is actuated by a user or in a batch pour operation where a predetermined volume of one or more selected beverage components are dispensed (e.g., one ounce at a time). UI 1002 may be addressed via a number of methods to select and dispense beverages. For example, a user may interact with UI 1002 via touch input to navigate one or more menus from which to select and dispense a beverage. As another example, a user may type in a code using an onscreen or physical keyboard (not shown) on beverage dispenser 804 to navigate one or more menus from which to select and dispense a beverage. As a further example, a user may interact with the HMI 1004 via a user interface of an application on the mobile device 852.

UI 1002, which may include a touch screen and a touch screen controller, may be configured to receive various commands from a user (i.e., consumer input) in the form of touch input, generate a graphics output and/or execute one or more operations with beverage dispenser 804 (e.g., via HMI 1004 and/or CDM 1006), in response to receiving the aforementioned commands. A touch screen driver in HMI 1004 may be configured to receive the consumer or customer inputs and generate events (e.g., touch screen events) that may then be communicated through a controller to an operating system of HMI 1004.

Beverage dispenser 804 may be in communication with one or more external device (e.g., mobile device 852 or POS 854). In some embodiments, the communication between beverage dispenser 804 and the external device may be accomplished utilizing any number of communication techniques including, but not limited to, near-field wireless technology such as BLUETOOTH, Wi-Fi and other wireless or wireline communication standards or technologies, via a communication interface.

Figure 11:
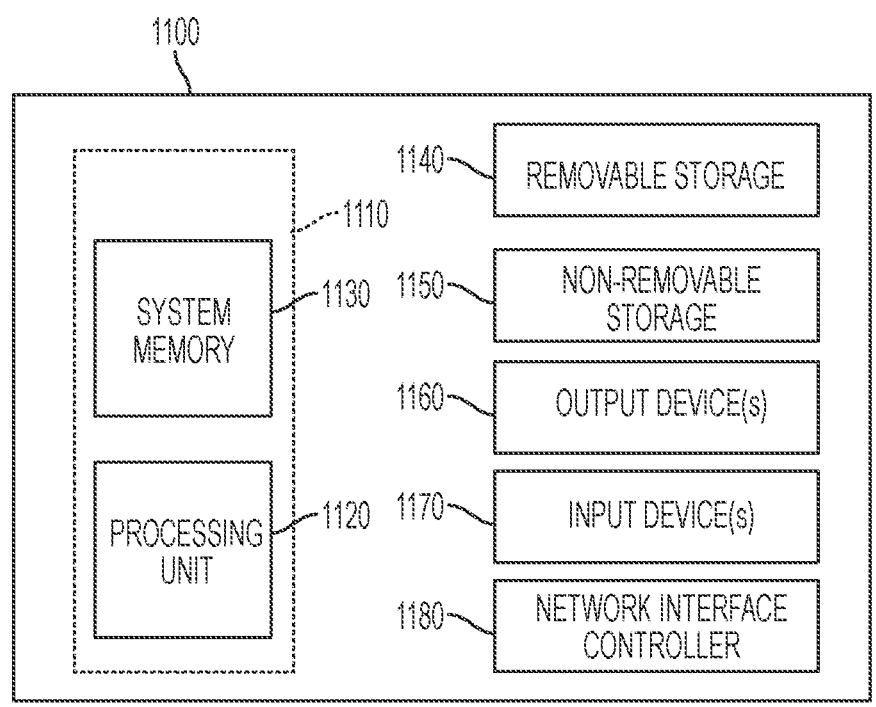
FIG. 11 is an exemplary computer system according to the teachings herein.

FIG. 11 illustrates an exemplary computer system 1100 suitable for implementing the several embodiments of the disclosure. For example, the controller 306, the solenoid driver 308, or one or more components or controller components of the beverage dispenser 804 may be implemented as the computer system 1100. In some implementations, one or both of the HMI 1004 and the CDM 1006 may be implemented as the computer system 1100.

It should be appreciated that the logical operations described herein with respect to the various figures may be implemented (1) as a sequence of computer implemented acts or program modules (i.e., software) running on a computing device (e.g., the computing device described in FIG. 11), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 11, an example computing device 1100 upon which embodiments of the invention may be implemented is illustrated. For example, each of the content source, key server, segmentations servers, caching servers, and client devices described herein may each be implemented as a computing device, such as computing device 1100. It should be understood that the example computing device 1100 is only one example of a suitable computing environment upon which embodiments of the invention may be implemented. Optionally, the computing device 1100 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In some embodiments, the computing device 1100 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some embodiments, virtualization software may be employed by the computing device 1100 to provide the functionality of a number of servers that is not directly bound to the number of computers in the computing device 1100. For example, virtualization software may provide twenty virtual servers on four physical computers. In some embodiments, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In its most basic configuration, computing device 1100 typically includes at least one processing unit 1106 and system memory 1104. Depending on the exact configuration and type of computing device, system memory 1104 may be volatile (such as random-access memory (RAM)), non-volatile (such as read-only memory (ROM), flash memory, etc.), or some combination of the two. This most basic configuration is illustrated in FIG. 11 by dashed line 1102. The processing unit 1106 may be a standard programmable processor that performs arithmetic and logic operations necessary for operation of the computing device 1100. While only one processing unit 1106 is shown, multiple processors may be present. Thus, while instructions may be discussed as executed by a processor, the instructions may be executed simultaneously, serially, or otherwise executed by one or multiple processors. The computing device 1100 may also include a bus or other communication mechanism for communicating information among various components of the computing device 1100.

Computing device 1100 may have additional features/functionality. For example, computing device 1100 may include additional storage such as removable storage 1108 and non-removable storage 1110 including, but not limited to, magnetic or optical disks or tapes. Computing device 1100 may also contain network connection(s) 1116 that allow the device to communicate with other devices such as over the communication pathways described herein. The network connection(s) 1116 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 1100 may also have input device(s) 1114 such as a keyboard, keypads, switches, dials, mice, track balls, touch screens, voice recognizers, card readers, paper tape readers, or other well-known input devices. Output device(s) 1112 such as a printer, video monitors, liquid crystal displays (LCDs), touch screen displays, displays, speakers, etc. may also be included. The additional devices may be connected to the bus in order to facilitate communication of data among the components of the computing device 1100. All these devices are well known in the art and need not be discussed at length here.

The processing unit 1106 may be configured to execute program code encoded in tangible, computer-readable media. Tangible, computer-readable media refers to any media that is capable of providing data that causes the computing device 1100 (i.e., a machine) to operate in a particular fashion. Various computer-readable media may be utilized to provide instructions to the processing unit 1106 for execution. Example tangible, computer-readable media may include, but is not limited to, volatile media, non-volatile media, removable media, and non-removable media implemented in any method or technology for storage of information such as computer readable instructions, data structures, program modules or other data. System memory 1104, removable storage 1108, and non-removable storage 1110 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 1106 may execute program code stored in the system memory 1104. For example, the bus may carry data to the system memory 1104, from which the processing unit 1106 receives and executes instructions. The data received by the system memory 1104 may optionally be stored on the removable storage 1108 or the non-removable storage 1110 before or after execution by the processing unit 1106.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flow control module, comprising:
a housing having an inlet and an outlet and a passageway extending between the inlet and the outlet, the passageway defining a flow path through the flow control module;
a thermal mass flow meter, the thermal mass flow meter located between the inlet and the outlet along the flow path, wherein the thermal mass flow meter is configured to communicate a first signal based on a flow rate of a fluid along the flow path;
a first solenoid assembly mounted to the housing, the first solenoid assembly configured as an on/off solenoid assembly such that the first solenoid assembly is operable to allow the fluid to flow along the flow path in an on position and prevent the fluid from flowing along the flow path in an off position; and
a second solenoid assembly mounted to the housing, the second solenoid assembly configured as a proportional solenoid assembly such that the second solenoid assembly is operable to receive a second signal in response to communication of the first signal and to proportionally control a flow rate of the fluid along the flow path through the flow control module based on the second signal,
wherein the thermal mass flow meter is further configured to communicate a third signal based on a measured temperature of the fluid,
wherein the second solenoid assembly is further configured to proportionally control the flow rate of the fluid based on a new set of calibration parameters upon a determination that the measured temperature of the fluid is outside a temperature range for the fluid.

2. The flow control module of claim 1, wherein the new set of calibration parameters change one or more of a location of an armature of the second solenoid assembly for a given flow rate, how often the second solenoid assembly makes adjustments made to proportionally control the flow rate, or how fast the armature of the second solenoid assembly moves to proportionally control the flow rate.

3. The flow control module of claim 1, wherein the thermal mass flow meter comprises a heater and a temperature sensor located at a distance toward the outlet relative to the heater.

4. The flow control module of claim 3, wherein the thermal mass flow meter further comprises a second temperature sensor located at the distance toward the inlet relative to the heater.

5. The flow control module of claim 3, wherein the thermal mass flow meter is configured to generate the first signal based on a measured amount of heat transferred from the heater to the temperature sensor.

6. The flow control module of claim 5, wherein the first signal is a voltage or current value of the measured amount of heat transferred or a flow rate value determined by the thermal mass flow meter based on the measured amount of heat transferred.

7. The flow control module of claim 3, wherein the temperature sensor comprises a thermocouple, a thermopile, or thermistor.

8. A fluid dispenser, comprising:
a controller; and
a flow control module, the flow control module comprising:
a housing having an inlet and an outlet and a passageway extending between the inlet and the outlet, the passageway defining a flow path through the flow control module;
a thermal mass flow meter, the thermal mass flow meter located between the inlet and the outlet along the flow path, wherein the thermal mass flow meter is configured to communicate a first signal to the controller based on a flow rate of a fluid along the flow path;
a shut-off valve configured to allow the fluid to flow along the flow path in an open position and prevent the fluid from flowing along the flow path in a closed position; and
a proportional control valve configured to receive a second signal from the controller in response to communication of the first signal and to proportionally control a flow rate of the fluid along the flow path through the flow control module based on the second signal,
wherein the controller is further configured to detect a change in phase of the fluid based on a comparison of the first signal to a threshold value indicative of the change in phase of the fluid.

9. The fluid dispenser of claim 8, wherein the controller is configured to determine the flow rate of the fluid based on the first signal.

10. The fluid dispenser of claim 9, wherein the first signal is a voltage or current value produced by the thermal mass flow meter or a flow rate value determined by the thermal mass flow meter.

11. The fluid dispenser of claim 9, wherein the controller is further configured to compare the determined flow rate of the fluid to a predetermined flow rate and to generate the second signal based on the comparison.

12. The fluid dispenser of claim 11, wherein the controller is further configured to receive the predetermined flow rate from a database.

13. The fluid dispenser of claim 8, wherein the controller is further configured to detect a bubble based on the change in phase of the fluid.

14. The fluid dispenser of claim 13, wherein the controller is configured to detect the bubble based upon detection of the change in phase for more than a predetermined threshold amount of time.

15. The fluid dispenser of claim 13, wherein the controller is further configured to generate a maintenance alert or a sold-out alert upon detection of a threshold number of bubbles or a threshold number of bubbles within a predetermined time period.

16. A sold-out detection system, comprising:
a sold-out sensor comprising:
a housing comprising an inlet and an outlet and a passageway extending between the inlet and the outlet, the passageway defining a flow path through the sold-out sensor; and
a thermal mass flow meter comprising a heater and a temperature sensor located at a distance toward the outlet relative to the heater, wherein the thermal mass flow meter is configured to generate a first signal based on a measured amount of heat transferred from the heater to the temperature sensor by a flow of a fluid along the flow path; and a controller configured to receive the first signal and detect a change in phase of the fluid based on a comparison of the first signal to a threshold value indicative of the change in phase of the fluid, wherein the controller is further configured to detect a bubble based on the detected change in phase of the fluid, and wherein the controller is further configured to detect a sold-out condition upon detection of a threshold number of bubbles or a threshold number of bubbles within a predetermined time period.

* * * * *